United States Patent Office 2,976,117
Patented Mar. 21, 1961

2,976,117
PROCESS FOR THE PREPARATION OF HYPOPHOSPHITES

René Pahud, Bex, Switzerland, assignor to La Fonte Electrique S.A., Bex, Switzerland, a corporation of Switzerland No Drawing. Filed July 23, 1956, Ser. No. 599,316

Claims priority, application Switzerland July 30, 1955

5 Claims. (Cl. 23—107)

This invention relates to a process for the preparation of hypophosphites by treating phosphorus in an alkaline medium.

Hypophosphorous acid and its salts are strong reducing gases in an aqueous solution. Chemical manufacturers are not interested in the large scale production of these compounds because there is no demand for them in large quantities. They are employed principally in chemical analysis and for medicinal purposes.

As a result there exists no planned and economical process for the preparation of hypophosphorous acid and its salts.

Generally, hypophosphites are prepared by heating crude phosphorus in an aqueous alkaline medium (metal hydroxide). It is generally admitted that the reaction takes place according to the following equation:

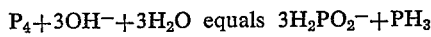

$$P_4 + 3OH^- + 3H_2O \text{ equals } 3H_2PO_2^- + PH_3$$

In actual fact, along with the hypophosphite ions, there is obtained phosphine, hydrogen and phosphite ions. Only 50% approximately of the phosphorus is transformed into hypophosphite.

The applicant, by research, has improved the manufacturing output of hypophosphites by diminishing the formation of phosphites and phosphine in remarkable proportions. By increasing the reactive surface, that is to say, by forming a phosphorus emulsion in an alkaline solution, one can to a large extent lower the temperature of reaction, and in this way one avoids the possibility that a part of the hypophosphite formed becomes oxidised into phosphite. Because of this artifice of an emulsion the output in hypophosphite reaches as much as over 70% of the phosphorus used in the operation. Reaction temperatures are brought down from 75–80° to 45–50°. Nevertheless there occurs a secondary phenomenon which is an inconvenience in this procedure. At temperatures between 40 and 50° C., along with the gaseous phosphine ($PH_3$) there is obtained a solid polymeric of phosphine $(PH_3)_x$, where $x$ may be the figure 2, 3, 4 etc. This polymeric remains in the hypophosphite and renders the latter extremely toxic by decomposing slowly into a monomeric in the air. To eliminate this polymeric which affects adversely the hypophosphites thus manufactured, it has been found that heating to 85°, for instance, decomposes it into a monomeric which is cleared off in the form of a gas.

The object of the invention is a process for the preparation of hypophosphites by treating the phosphorus with a metallic hydroxide and water. The process is characterized by the fact that the phosphorus is treated in the form of an emulsion in an aqueous solution of at least one metallic hydroxide, at a temperature below 60° C., and by the fact that the phosphine polymeric formed as a secondary product, is subsequently decomposed by heating the reactional mixture.

First of all, the phosphorus is treated in a mechanical emulsifying machine in order to reduce the size of the particles to a minimum so that it will form an emulsion in the alkaline solution in which it is subjected to treatment.

This treatment of the phosphorus in emulsion is usually carried out at a temperature between 40 and 50° C., and preferably between 45 and 50° C. At the close of the operation, the temperature is raised for a short time in order to decompose the phosphine polymeric $(PH_3)_x$ and to clear away the gaseous monomeric phosphine. Heating to 85° for 3 minutes is sufficient.

In carrying out the process according to the invention, one restricts the formation of phosphite ions $HPO_3^-$, to a minimum.

The resulting solution contains more than 70% of phosphorus in the form of hypophosphite, the remainder being in the forms of phosphite and phosphine.

To separate the two salts (hypophosphite and phosphite) which form when NaOH is used, the accepted method hitherto used has been to treat the sodium solution with $Ca^{++}$ cations and thus bring about the formation of insoluble $CaHPO_3$ which can be filtered. This method entails the formation at the same time, of NaOH which remains in the solution and is difficult to separate from it:

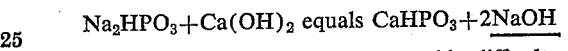

$$Na_2HPO_3 + Ca(OH)_2 \text{ equals } CaHPO_3 + 2NaOH$$

The usual manner of getting over this difficulty has been to substitute $Ca(OH)_2$ in the place of NaOH, at the commencement of the process. As a result there is formed simultaneously, some $CaHPO_3$ which is insoluble and some $Ca(H_2PO_2)_2$ which is soluble. By filtering only $Ca(H_2PO_2)_2$ is obtained which must then be transformed into sodium salt or into hypophosphorous acid by treatment with $Na_2SO_4$ or else $H_2SO_4$. A precipitation of $CaSO_4$ results. In addition to the expense involved by the reactions, a fresh filtering is required with all the losses arising from these operations.

By operating according to the process of the present invention, it is possible to arrange in advance the percentage of phosphorus transformed into phosphite. For instance, in the preparation of hypophosphite of sodium, one is able to fix the quantity of ions OH which are to be supplied by NaOH (formation of hypophosphite) and the quantity of ions OH to be supplied by $Ca(OH)_2$ (formation of phosphite). A solution of hypophosphite of sodium may then be obtained directly and without further treatment, from which the phosphite is separated in the form of insoluble $CaHPO_3$. In this way the separation is effected automatically in the course of the preparation and without supplementary operations of adding $Ca(OH)_2$, eliminating the excess of the latter by $CO_2$, then treating with $NaSO_4$ or $H_2SO_4$, and also neutralising by $Na_2CO_3$. By following the process described above, one avoids considerable expense incurred for additional reactions and the inevitable losses in the final product.

Moreover it has been observed that the presence of organic aliphatic acids stabilises the hypophosphite solution obtained. During the operation, and generally, after the separation of the phosphites, from 0.1 to 2% of oxalic acid, tartaric or succinic acid may be added. These enable the concentration of the solution of hypophosphite to take place in the most favourable conditions.

What I claim is:

1. A process for the preparation of a hypophosphite comprising forming at a temperature between 40 and 60° C. an emulsion of elemental phosphorus in an aqueous solution of at least one metal hydroxide, stirring the emulsion and maintaining said temperature until all the phosphorus has reacted, whereby a hypophosphite is formed, and finally heating the resulting reaction mixture at a temperature above 60° C. until formed phosphine polymeric is decomposed.

2. A process according to claim 1 in which the temperature of the emulsion is maintained between 40 and 50° C. during the formation of the emulsion and the subsequent stirring.

3. A process for the preparation of a hypophosphite comprising forming at a temperature between 40 and 60° C. an emulsion of elemental phosphorus in an aqueous solution of at least one metal hydroxide, stirring the emulsion while maintaining the temperature until all the phosphorus has reacted, whereby a hypophosphite is formed, heating the resulting reaction mixture to a temperature of 85° C. and maintaining said last mentioned temperature for a few minutes, whereby phosphine polymeric formed below 60° C. is decomposed.

4. A process for the preparation of a hypophosphite comprising forming at a temperature between 40 and 60° C. an emulsion of elemental phosphorus in an aqueous solution of a mixture of an alkali metal hydroxide and $Ca(OH)_2$, stirring the emulsion while maintaining the temperature until all the phosphorus has reacted, whereby a hypophosphite is formed, the phosphite ions formed as secondary products being eliminated in the form of insoluble $CaHPO_3$ while the hypophosphite ions remain in solution, heating the resulting reaction mixture at a temperature above 60° C. until formed phosphine polymeric is decomposed.

5. A process for the preparation of a hypophosphite comprising forming at a temperature between 40 and 60° C. an emulsion of elemental phosphorus in an aqueous solution of at least one metal hydroxide, stirring the emulsion while maintaining the temperature until all the phosphorus has reacted, whereby a hypophosphite is formed, adding to the reaction mixture an aliphatic acid selected from the group consisting of oxalic acid, tartaric acid and succinic acid, and heating the resulting reaction mixture at a temperature above 60° C. until formed phosphine polymeric is decomposed.

References Cited in the file of this patent

UNITED STATES PATENTS 2,595,198   Lefforge et al. _____ Apr. 29, 1952

FOREIGN PATENTS 441,474   Great Britain _____ Jan. 20, 1936

OTHER REFERENCES

Phosphorus and its Compounds, Van Wazer, vol. 1, Chem., pages 355–359, Interscience Publisher, 1958.

Systematic Inorganic Chemistry, Yost and Russel, chap. 6, pages 191–194, Prentice-Hall, 1944.